United States Patent [19]

LaBounty

[11] Patent Number: 4,519,135
[45] Date of Patent: May 28, 1985

[54] METAL DEMOLITION SHEAR

[76] Inventor: Roy E. LaBounty, 1607 8th Ave., Two Harbors, Minn. 55616

[21] Appl. No.: 416,902

[22] Filed: Sep. 13, 1982

[51] Int. Cl.³ .................... B23P 19/00; E02F 3/28
[52] U.S. Cl. ........................................ 30/134; 83/609;
83/928; 37/117.5; 144/34 E; 414/740
[58] Field of Search ................... 37/117.5, DIG. 3;
414/740, 739; 30/134, 228, 231, 266; 144/34 E;
83/609, 928

[56] References Cited

U.S. PATENT DOCUMENTS

| | | |
|---|---|---|
| 3,814,152 | 6/1974 | Pallari ................................ 144/34 E |
| 4,104,792 | 8/1978 | LaBounty ............................. 30/134 |
| 4,188,721 | 2/1980 | Ramun ................................ 30/134 |
| 4,198,747 | 4/1980 | LaBounty ............................. 30/134 |
| 4,376,340 | 3/1983 | Ramun ................................ 30/134 |
| 4,403,431 | 9/1983 | Ramun et al. ....................... 37/117.5 |

Primary Examiner—Jimmy C. Peters
Attorney, Agent, or Firm—Palmatier, Sturm, Sjoquist & Baker, Ltd.

[57] ABSTRACT

A heavy duty shear for a backhoe including a lower jaw having a shear blade and a guide blade lying along each other and tied together at their outer ends, an upper jaw defining a shear blade and having a wear plate or guide to engage and slide along the guide blade of the lower jaw, the guide blade of the lower jaw having its edge recessed below the level of the cutting edge of the shear blade of the lower jaw.

22 Claims, 5 Drawing Figures

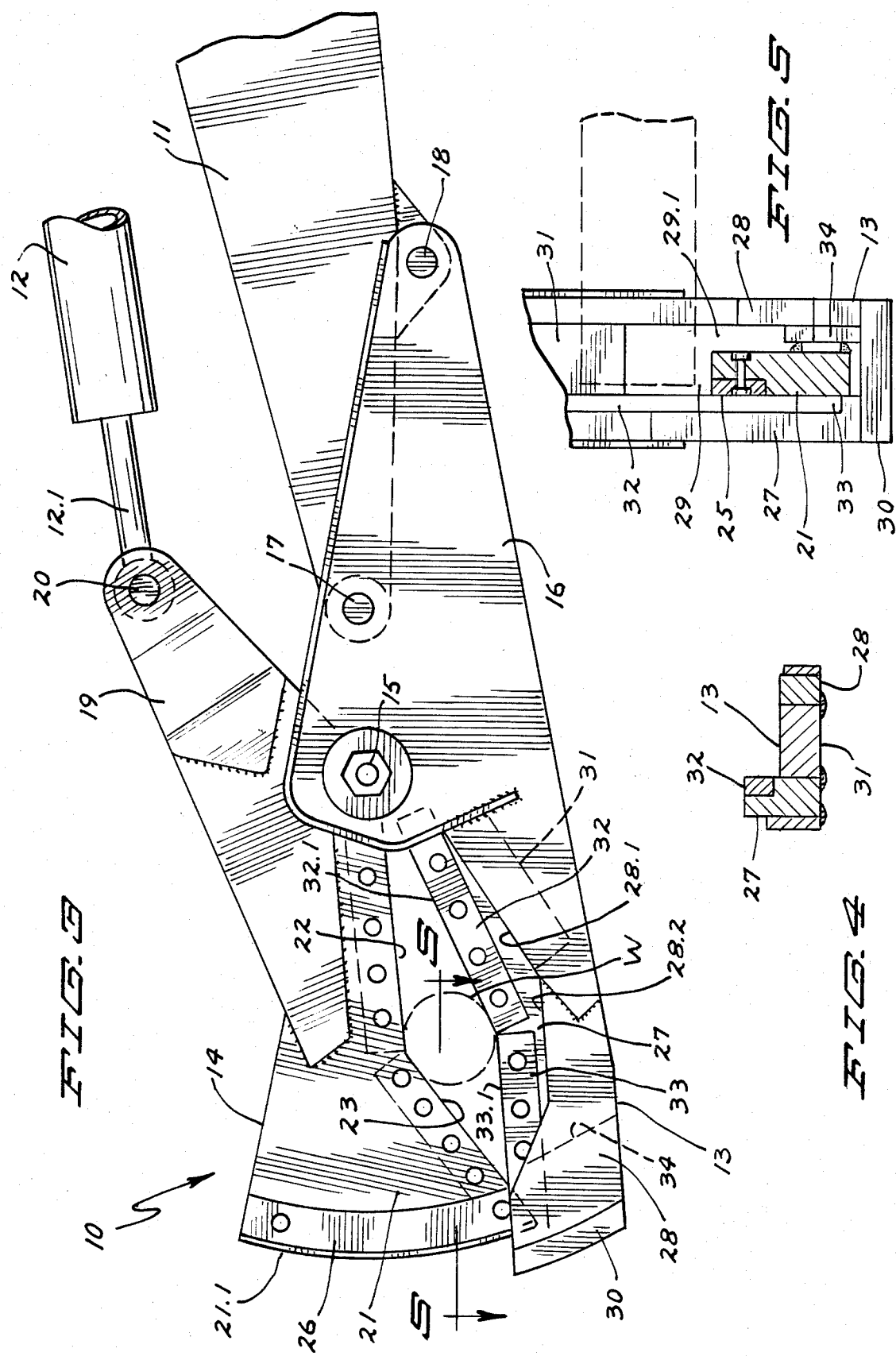

METAL DEMOLITION SHEAR

This invention relates to a heavy duty shear, especially adapted to be mounted on a rigid boom of a mobile vehicle and particuarly adapted to be mounted on the dipper stick of a backhoe.

BACKGROUND OF THE INVENTION

Heavy duty shears of the type that are powered by hydraulic cylinders are proving more and more useful in handling scrap and especially metal scrap of all sorts. Such scrap comes in many different forms, and may be in the form of pipes made of steel or soft iron or cast iron, ranging in sizes from 2 inches or smaller, and up to 8 or 10 inches in diameter or larger; structural beams such as I-beams, channels, angle beams in a large range of sizes, up to 8 or 10 inches across and larger; rods and heavy cables having diameters of 2 to 3 inches and larger, metal sheets and plates and formed metal of all sorts including wheels and automobile and truck frames, and a myriad of long and short pieces of stock and metal pieces that are cast, rolled, stamped or otherwise formed, both singly and in various types of assembly.

The prior art has included numerous shears such as that illustrated in U.S. Pat. No. 4,198,747; U.S. Pat. No. 4,188,721; and U.S. Pat. No. 4,104,792. Typically, these heavy duty shears mount on the dipper stick of a backhoe so that the shears may be controlled fairly well in handling various types of scrap and cutting the scrap into smaller pieces or lengths.

However, the prior art shears have had numerous disadvantages, not permitting the shear to be used as efficiently and rapidly as may be desired, considering the amount of scrap that must be reduced in size before further processing.

SUMMARY OF THE INVENTION

An object of the invention is to provide a new and improved heavy duty shear for handling and severing metal scrap of substantially all shapes and sizes in order to reduce the scrap to small pieces for bulk handling during reprocessing.

Another object of the invention is to provide a novel shear capable of efficiently handling and reducing the size of scrap that exists in long pieces, such as beams, pipes, cables, etc.

A feature of the present invention is a heavy duty shear attachable to the dipper stick of a backhoe. The shear has a rear or lower jaw, and a front or upper jaw opposite the lower jar and pivoted to it. The upper jaw is opened and closed by the hydraulic cylinder of the backhoe.

The upper and lower jaws have cooperating shear blades with replaceable inserts defining the blades' cutting edges. The shear blades have inner and outer edge portions along their lengths, and such inner and outer edge portions of each blade are obliquely oriented with respect to each other and at an obtuse angle to each other.

The lower jaw has a rigid guide blade extending along the shear blade and spaced therefrom. The guide blade and shear blade are affixed together at their adjacent outer ends, as to prevent sheared scrap metal from wedging between the outer ends of the blades and to prevent such outer ends from spreading further apart.

The guide blade and shear blade are also connected together at their inner ends adjacent the pivot. The connection is provided by a rigid plate welded to the blades and traversing the space between the inner portions of the blades, adjacent the pivot. The rigid connector plate is spaced below the cutting edge of the lower shear blade and prevents sheared metal scrap from being wedged into the space between the shear and guide blades of the lower jaw.

The lower jaw defines an open slot between the outer edge portion of the shear blade and the adjacent guide blade. The outer end of the slot is traversed by a rigid tie plate welded to the shear and guide blades.

The open slot receives the outer end of the upper shear blade as the upper jaw is closed. During closing of the jaws, the shear edges traverse each other in shearing relation. The open slot is significantly wider than the upper shear blade, thus allowing significant open space between the top shear blade and the guide blade while the upper shear blade is in the open slot.

The confronting sides of the upper jaw and the guide blade have wear or guide plates affixed thereon and engaging each other as the upper and lower shear blades are shearing a workpiece. On the guide blade, the wear or guide plate is disposed at the outer end, adjacent the transverse tie plate. The outer end of the upper jaw is arcuately shaped and the wear or guide plate thereon is also arcuately shaped adjacent the outer end.

The guide blade, which is spaced by the width of the open slot from the cutting edge of the lower shear blade, has its upper edge spaced well below the cutting edge of the lower shear blade. The guide blade will thereby provide a workpiece support for the workpiece after the blades have sheared off a length of the workpiece. The backhoe boom and shear may then be swung to the side and thereby move the shear blade along the workpiece in preparation for cutting off another length of the workpiece. As a result, a long girder or pipe or heavy cable may be cut several times into short lengths without dropping the workpiece and without having to repeatedly pick the workpiece off the ground.

The improvements in the shear provide the advantage of facilitating ready and easy handling of long workpieces to cut them repeatedly into short lengths without the need to retrieve them off the ground after each cut. In addition, the outer ends of the lower shear blade and of the guide blade are rigidly interconnected to minimize transverse movement of the shear blades when cutting and to apply transverse pressure against the swinging upper shear blade all during shear of the work piece.

BRIEF DESCRIPTION OF THE DRAWINGS

FIG. 3 is a side elevation view of the shear.

FIG. 4 is a detail section view taken approximately at 4—4 of FIG. 2.

FIG. 5 is a detail section view taken approximately at 5—5 of FIG. 3.

DETAILED SPECIFICATION

Figure 1:
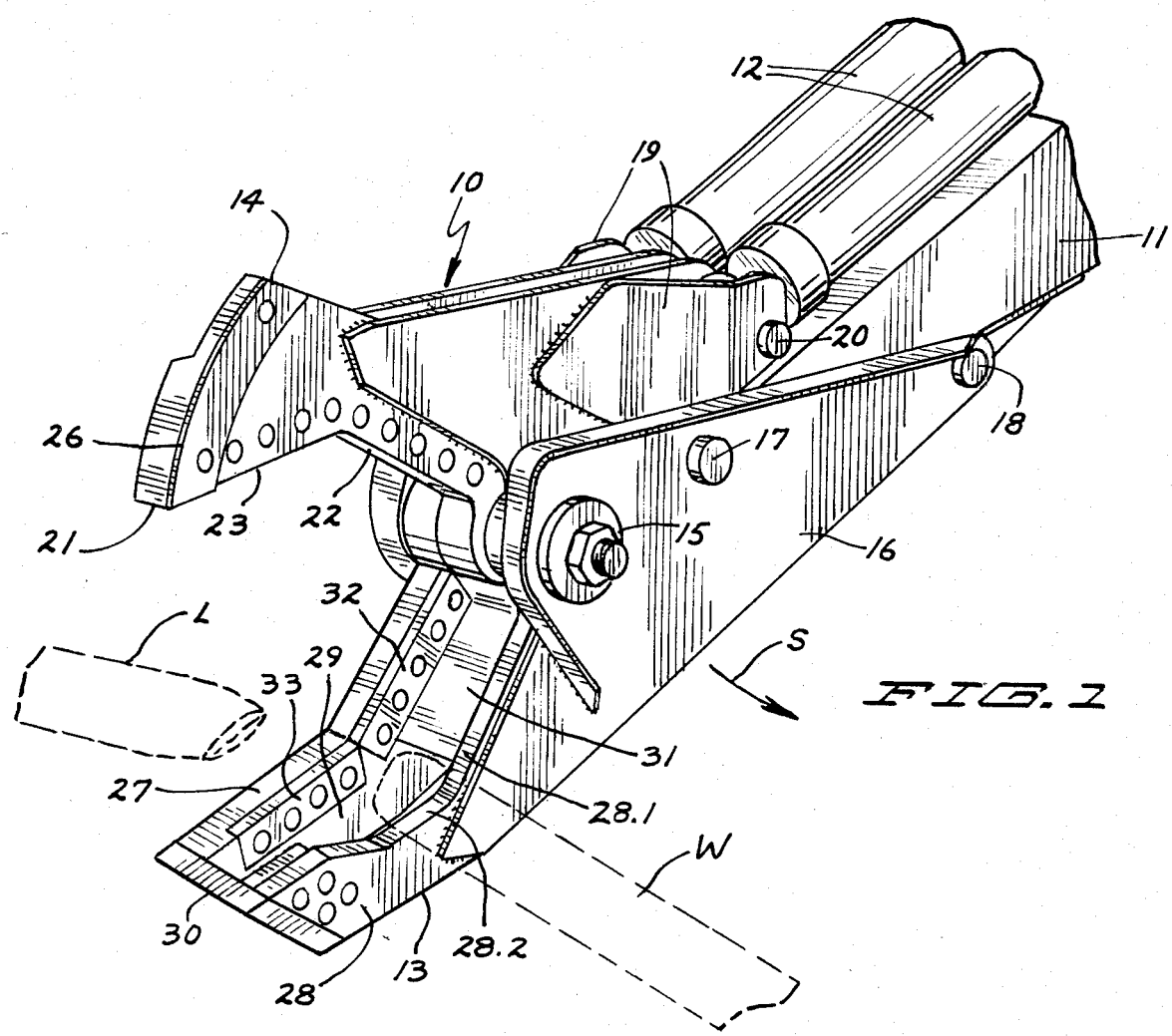
FIG. 1 is a perspective view of the shear attached to the dipper stick of a backhoe.
Figure 2:
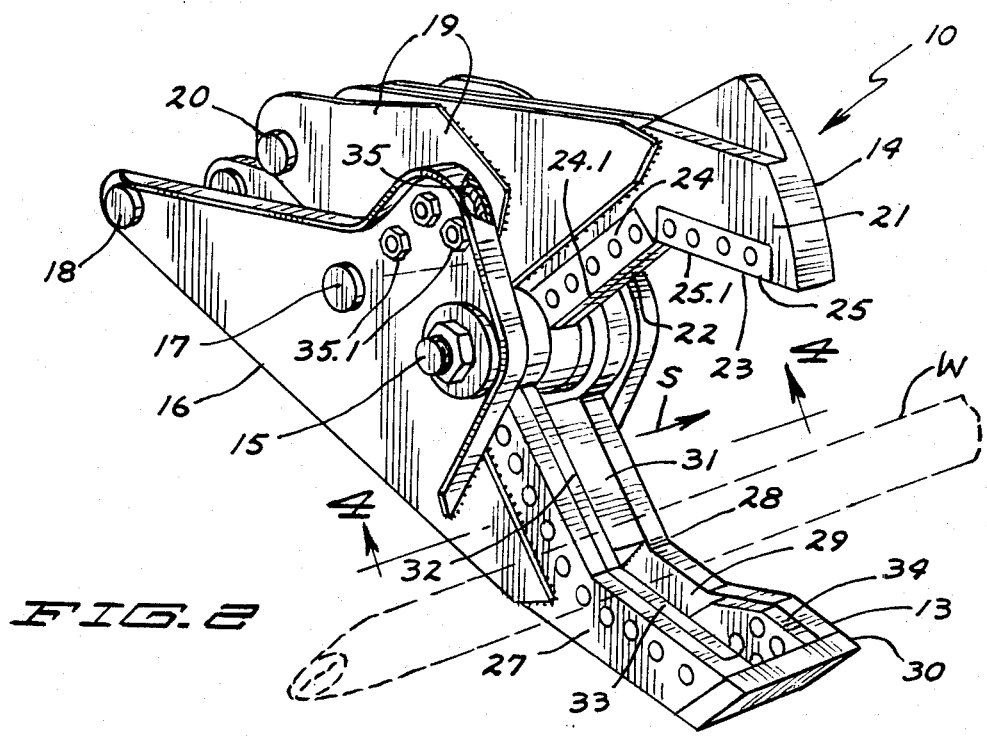
FIG. 2 is another perspective view of the shear, deteched from the backhoe.

One form of the invention is illustrated in the drawings and is described herein. The heavy duty shear is indicated in general by numeral 10 and is to be mounted upon the rigid dipper stick 11 which is a portion of the boom structure of a backhoe, and is to be connected to the hydraulic system of the backhoe at cylinder or cylinders 12 of the backhoe which cylinders lie along the dipper stick 11, and have their cylinder ends affixed to the backhoe.

The shear 10 includes a lower or rear jaw 13 and an upper or front jaw 14 which are interconnected by a pivot and bearing structure 15 which accommodates swinging of the upper jaw 14 relative to the lower jaw 13.

The lower jaw 13 has rigid mounting plates 16 carrying removable pins 17 and 18, thereby adapting the mounting plates 16 for attachment, rigidly, to the dipper stick 11 of the backhoe.

The upper jaw 14 also has a bracket made of rigid plates 19 carrying removable pins 20 adapted for attachment to the extendable piston rod 12.1 of the hydraulic cylinder 12. The bracket plates 19 and the mounting plates 16 may take different shapes, depending upon the exact nature of the connections to the dipper stick 11 and to the hydraulic cylinder 12, which connections may vary from one particular backhoe to backhoes of another make or model.

The upper jaw 14 defines a shear blade 21 which has inner and outer edge portions 22 and 23, respectively, oriented obliquely of each other. The upper shear blade 21 has hardened cutting inserts 24 and 25 extending along the inner and outer portions of the blade and defining shear edges 24.1 and 25.1. The inserts 24 and 25 are formed of extremely hard high carbon steel and are elongate bar shaped as to provide for separate edges which may be put into use by reorienting the inserts on the blade 21. The inserts 24 and 25 are detachably mounted on the blade 21 as by mounting bolts in the holes provided.

The upper shear blade 21 also has a pressure plate or wear plate 26 secured on its left side adjacent the outer end 21.1 and arcuately shaped about the center of the pivot 15. The pressure plate 26 is welded to the blade 21, but may be replaceable when it is worn. The lower jaw 13 has a lower shear blade 27 and a rigid guide blade 28 extending along each other and outwardly from the pivot 15. The shear blade 27 and the guide blade 28 are rigidly affixed to each other and to the mounting plates 16 so as to be rigid with the dipper stick 11 of the backhoe when mounted thereon. Although the lower shear blade 27 and the guide blade 28 are spaced widely apart to define an open slot 29 into which the upper shear blade 21 may swing, the lower shear blade 27 and the guide blade 28 are rigidly interconnected at their outer ends by a rigid tie plate 30 which is welded to both the shear blade 27 and the guide blade 28.

The inner portions of the shear blade 27 and the guide blade 28, adjacent the pivot 15, are also interconnected by a transverse rigid plate 31, which is also affixed as by welding to both the shear blade and the guide blade 28. The plate 31 obstructs the open slot 29 adjacent the inner portions of the shear blade 27 and guide blade 28.

The lower shear blade 27 also has replaceable inserts 32 and 33 defining the inner and outer cutting edge portions 32.1 and 33.1 of the lower shear blade 28. These inner and outer portions of the shear blade 28 are oriented obliquely with respect to each other and at an obtuse angle; and similarly, these inner and outer edge portions of the lower shear blade 28 are oriented at acute angles with respect to the inner and outer edge portions 24.1 and 25.1 of the upper shear blade 21 so that the upper and lower shear blades 21 and 27 cooperate with each other in cradling a workpiece W approximately midway along the length of the blades. The inserts 32 and 33 are also demountably attached as by bolts so that these inserts may be rearranged so that any of their four edges may be arranged as cutting shear edges before the inserts need to be replaced.

The guide blade 28 has its inner and outer supporting edge portions 28.1 and 28.2 of its upper edge located well below the inner and outer edge portions 32.1 and 33.1 of the lower shear blade 27, as best seen in FIG. 3. As is evident in FIGS. 3 and 4, the supporting edge portions 28.1 and 28.2 of the guide blade are spaced below the edge portions 32.1 and 33.1 of the lower shear blade 27 by a distance approximating the thickness of the shear blade 27, or approximating the depth of the insert bars 32, 33 as seen in FIG. 4. These inner and outer upper edge portions 28.1 and 28.2 are oriented at oblique angles with respect to each other, at an angle very similar to the angle between the inner and outer edge portions of the lower shear blade 27. The top surface of the transverse plate 31 lies substantially flush with the inner portion 28.1 of the top edge of the guide blade 28, and accordingly, the plate 31 is located below the inner insert 32 of the lower shear blade. Because the upper edge of the guide blade 28 lies below the level of the shear edges of the shear blade 27, the workpiece W, after it is sheared and a short length L of the workpiece is severed, the workpiece will settle onto and be supported by the upper edge portions 28.1 and 28.2 of the guide blade so that the workpiece need not be picked up off the ground again, but is ready for additional cuts to be made. After the short length L has been cut from the workpiece W, the shear 10 and the boom and dipper stick 11 of the backhoe will be swung to the side, substantially in the direction of arrow S so that the lower jaw 13, which continues to support the workpiece W on the guide blade 13, will simply slide along the workpiece to a new location, whereupon the workpiece may be cut again, or the top jaw 14 may be closed to grip the workpiece, thereby allowing the workpiece to be pulled to a new location where cutting may occur.

The guide blade 28 is spaced sufficiently from the shear blade 27 so that when the upper shear blade 21 is swung down into the open slot 29, there remains a significant open space 29.1 between the confronting faces of the upper blade 21 and the guide blade 28. As a result, the likelihood of wedging a piece of the scrap into the open space is minimized.

The guide blade also carries a wear or pressure plate 34 removably affixed as by bolts to the side of the guide plate 28, at its outer end. The plate 34 engages the pressure or wear plate 26 of the upper shear blade 21 when the shear blade is swung downwardly across the lower shear blade and into the open slot 29. Another pressure pad 35 is mounted on the mounting panel 16, to the right of the upper shear blade 21, and in sliding engagement with the front portion of plate 19, at a location about the pivot 15. The pressure pad 35 is adjustable by screws 35.1 with the effect that the pressure pad 35 will apply force against the top jaw 14 as the shear blade 21 moves transversely across the lower shear blade 27 so as to cooperate with the pressure pads 26 and 34 in maintaining the upper shear blade in shearing engagement with the lower shear blade 27.

By securing the guide blade 28 rigidly to the lower shear blade 27, and guiding the movement of the upper shear blade 21 by the pressure pads or wear plates 34 and 26 and the pressure pad 35 moving against the plate 39, the two shear blades are maintained in shearing engagement with each other during the downward shearing movement of the upper shear blade 21. In addition, after the shearing of the workpiece W has been completed, the end of the workpiece continues to be supported upon the upper edge of the guide plate 28 so that the workpiece does not have to be retrieved off the ground before another cut can be made. The shear 10 and backhoe stick 11 are simply swung to the side in the direction of arrow S, moving the lower jaw beneath the workpiece so that another cut can be readily made. Alternatively, the upper jaw 14 may be moved downwardly to grip the workpiece to pull it to a new position before the cut is made.

What is claimed is:

1. A heavy duty shear for attachment to the boom structure and hydraulic system of a backhoe, comprising
    a lower jaw and an upper jaw and pivot means interconnecting the jaws together, the lower jaw having frame means for attachment to the boom structure of the backhoe and the upper jaw having means for attachment to the hydraulic system of the backhoe for closing and opening the upper jaw relative to the lower jaw,
    the lower jaw and the upper jaw having rigid lower and upper shear blades extending along each other and having a thickness and a width greater than the thickness to provide strength for shearing a workpiece of such scrap metal when the upper blade is closed onto the lower shear blade,
    the upper and lower shear blades having inner and outer workpiece engaging edge portions opposite each other and also having intermediate portions between said inner and outer edge portions, the inner and outer edge portions of the upper shear blade extending obliquely of each other,
    the lower jaw also having a rigid guide blade lying along the shear blade and in spaced relation therewith, the outer ends of the shear and guide blades being adjacent each other, rigid means securing the outer ends of the lower shear blade and the guide blade together,
    the guide blade having a top surface extending from its outer end and toward the pivot means, said top surface having an outer end disposed directly opposite the cutting edge of the lower shear blade at the outer ends of the lower shear and guide blades, the upper shear blade traversing the lower shear blade and traversing the guide blade at the outer end of the top surface in a shearing motion, and said top surface also having support portions extending along both the inner and outer edge portions of the lower shear blade, and said support portions being spaced below the cutting edge of the lower shear blade by a distance at least as great as the approximate thickness of the lower shear blade to be normally spaced below a workpiece on the shear blade to receive and support the workpiece after the workpiece is severed by the shear blades.

2. A heavy duty shear according to claim 1 and pressure plates slideably engageable with each other and respectively affixed on the side of the upper shear blade and on the side of the guide blade and bearing against each other during shearing movement of the upper shear blade.

3. A heavy duty shear according to claim 2 and the pressure plates being at the outer ends of the upper shear blade and of the guide blade.

4. A heavy duty shear according to claim 2 and the pressure plate on the upper shear blade being arcuately curved about the axis of the pivot and located adjacent the outer end of the blade.

5. A heavy duty shear according to claim 1 and the rigid means comprising a rigid tie plate welded across the outer ends of the adjacent shear and guide blades.

6. A heavy duty shear according to claim 1 and the guide blade also having a side face extending along the support portions of the top face and confronting the lower shear blade, said side face being spaced from the lower shear blade by a distance in excess of the thickness of the upper shear blade to be spaced from the upper shear blade when the upper jaw is closed onto the lower jaw.

7. A heavy duty scrap metal shear for attachment to the boom structure and hydraulic system of a backhoe, comprising
    a lower jaw and an upper jaw and pivot means interconnecting the jaws together, the lower jaw having frame means for attachment to the boom structure of the backhoe and the upper jaw having means for attachment to the hydraulic system of the backhoe for closing and opening the upper jaw relative to the lower jaw,
    the lower jaw and the upper jaw having rigid lower and upper shear blades extending along each other and having a thickness and a width greater than the thickness to provide strength for shearing a workpiece of such scrap metal when the upper blade is closed onto the lower shear blade,
    the upper and lower shear blades having inner and outer workpiece engaging edge portions opposite to each other and also having intermediate portions between said inner and outer edge portions, the inner and outer edge portions of the upper shear blade extending obliquely of each other,
    the lower jaw also having a rigid guide blade lying along and spaced from the lower shear blade to permit the upper shear blade to pass therebetween,
    and the guide blade having a top supporting surface spaced below the cutting edge of the lower shear blade by a distance at least as great as the approximate thickness of the lower shear blade to be normally spaced below the workpiece on the shear blade, the top supporting surface extending along both of the inner and outer edge portions of the lower shear blade to receive and support the workpiece after the workpiece is severed by the shear blades.

8. A heavy duty according to claim 7 and there being an open slot between the lower shear blade and the adjacent guide blade to receive the upper shear blade therein, the open slot having a width wider than the thickness of the upper shear blade to maintain open space between the upper shear blade and the guide blade when the upper guide blade is in the open slot.

9. A heavy duty shear according to claim 7 and the top supporting edge of the guide blade having inner and outer portions oriented obliquely of each other to cradle a workpiece therebetween.

10. A heavy duty shear according to claim 7 wherein the inner and outer portions of the upper shear blade respectively extending at acute angles with respect to the inner and outer portions of the lower shear blade and of the guide blade.

11. A heavy duty shear according to claim 8 wherein the open slot is open and unobstructed along said outer edge portion of the lower shear blade.

12. A heavy duty shear according to claim 7 wherein the inner and outer edge portions of the lower blade extend obliquely of each other and forming an angle with respect to each other at said intermediate portion.

13. A heavy duty shear according to claim 7 wherein the lower jaw also has an outer end with means affixing the shear blade and guide blade to each other.

14. A heavy duty shear according to claim 13 wherein the upper shear blade and the guide blade have outer tip ends confronting each other as the upper jaw is closed into the lower jaw, a rigid spacer on the confronting tip end of the guide blade and bearing against the upper shear blade as the upper jaw closes relative to the lower jaw.

15. A heavy duty shear according to claim 7 wherein the frame means are elongate to provide an extension of the boom structure in a predetermined direction, the upper and lower jaws also extending in said direction whereby to orient said upper and lower shear blades in said direction when the upper jaw is opened relative to the lower jaw.

16. A heavy duty shear according to claim 7 where in the inner and outer edges of the upper shear blade form an obtuse angle relative to each other.

17. A heavy duty shear according to claim 1 and rigid spacer means between the adjacent outer ends of the upper shear blade and the guide blade when the upper jaw is closed onto the lower jaw, the spacer means being affixed to at least one of said adjacent blades and permitting the upper shear blade to traverse the guide blade while being held in shearing relation with the lower shear blade.

18. A heavy duty shear according to claim 17 wherein the spacer means includes a separate portions respectively affixed to each of the upper shear blade and the guide blade.

19. A heavy duty shear according to claim 17 wherein the spacer means include edge portion on the upper shear blade and on the guide blade, said edge portions traversing each other with a shearing motion when the upper shear blade traverses the guide blade.

20. A heavy duty scrap metal shearing for attachment to the boom structure and hydraulic system of a backhoe, comprising a lower jaw and an upper jaw and pivot means interconnecting the jaws together, the lower jaw having frame means for attachment to the boom structure of the backhoe and the upper jaw having means for attachment to the hydraulic system of the backhoe for closing and opening the upper jaw the lower jaw and the upper jaw having rigid lower and upper heavy duty shear blades extending along each other for shearing a workpiece of such scrap metal when the upper blade is closed onto the lower shear blade, the upper and lower shear blades having inner and outer workpiece engaging edge portions opposite to each other and also having intermediate portions between said inner and outer edge portions, the inner and outer edge portions of the upper shear blade extending obliquely of each other, the upper and lower shear blades having elongate hardened steel insert bars affixed thereon and defining said edge portions for shear such scrap metal, the bars having depth in a direction transversely of such edge portions to accommodate such shearing of scrap metal, the lower jaw also having a rigid guide blade lying along and spaced from the lower shear blade to permit the upper shear blade to pass there between, and the lower jaw having an outer end with means affixing the outer ends of the lower shear blade and the guide blade to each other, and the guide blade having a top supporting surface spaced below the workpiece engaging edge portions of the lower shear blade by a distance approximating the depth of the insert bar on the lower shear blade to be normally spaced below the workpiece on the shear blade, the top supporting surface extending along both of the inner and outer edge portions of the lower shear blade to receive and support the workpiece after the workpiece is severed by the shear blades.

21. A heavy duty shear according to claim 20 wherein the inner and outer edge portions of the lower shear blade extend obliquely of each other.

22. A heavy duty shear according to claim 20 wherein the guide blade is spaced from the lower blade by a distance in excess of the thickness of the upper shear blade whereby when the upper shear blade is closed into shearing relation with the lower shear blade, and unobstructed space exists between the upper shear blade and the guide blade.

* * * * *

UNITED STATES PATENT AND TRADEMARK OFFICE
CERTIFICATE OF CORRECTION

PATENT NO. : 4,519,135

DATED : May 28, 1985

INVENTOR(S) : Roy E. LaBounty

It is certified that error appears in the above-identified patent and that said Letters Patent is hereby corrected as shown below:

Column 6, line 54, after "duty", insert --shear--.

Signed and Sealed this

Twenty-fourth Day of December 1985

[SEAL]

Attest:

DONALD J. QUIGG

Attesting Officer

Commissioner of Patents and Trademarks